O. M. Pike

Cutting Vitreous Substances.

No. 3,441. Reissued May 18, 1869.

Witnesses.

Wm. F. Browne

R. S. Turner.

Inventor.

Davis and De Wolf (assees. of Oni M. Pike)

By their atty.

R. D. Smith.

UNITED STATES PATENT OFFICE.

WENDELL T. DAVIS AND AUSTIN DEWOLF, OF GREENFIELD, MASSACHUSETTS, ASSIGNEES OF OZI M. PIKE.

IMPROVED MACHINE FOR CUTTING VITREOUS SUBSTANCES.

Specification forming part of Letters Patent No. 85,396, dated December 29, 1868; Reissue No. 3,441, dated May 18, 1869.

*To all whom it may concern:*

Be it known that OZI M. PIKE, of Leverett, in the county of Franklin and State of Massachusetts, has invented a new and useful Improvement in Machines for Cutting Glass and Other Like Vitreous Substances; and we do hereby declare the following to be a full, clear, and exact description of the same, reference being had to the accompanying drawings, in which—

Figure 1:
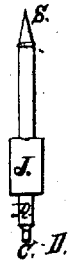
Figure 2:
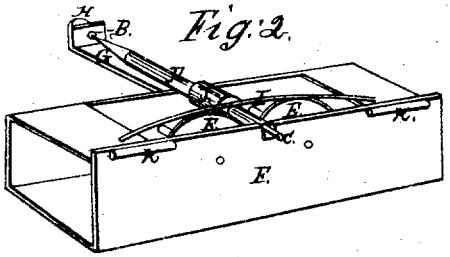
Figure 3:
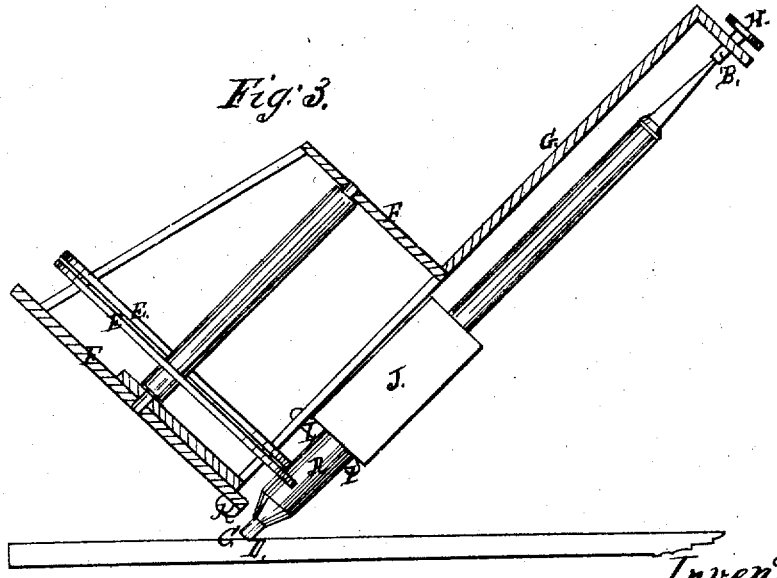

Figure 1 represents the cutter. Fig. 2 is a perspective view of the cutter as attached to its frame or holder, the under or bottom side being shown. Fig. 3 is an enlarged cross-section, showing the manner of applying the cutter.

It is known that a fracture of the surface of glass may be produced when a hard angular body is presented thereto, and the surface of contact is very small in proportion to the force exerted, and it is apparent that this fracture may be prolonged as required if the points of contact are continuously transferred along a given line. This invention, therefore, relates to the art of producing a continuous fracture along the surface of glass or other like vitreous substance of compression; and it consists in a tool composed of a disk free to revolve upon its axis as it passes over the surface to be fractured, thereby continuously transferring the point of contact along any desired line, said disk being mounted in a suitable frame or holder.

The diamond alone has generally and almost exclusively heretofore been available for the purpose of cutting glass and other like vitreous substances, because of the extreme hardness of those substances. The use of the diamond for such purposes requires a considerable amount of skill, which can only be acquired by practice, and the tools themselves are not only costly, but are liable to injury from accidental causes. For these reasons efforts have long been made to procure a material or device which could, in whole or in part, supersede the diamond for these purposes. Hitherto no such substitute has been found until the discovery of this invention, by which a revolving disk may be caused to cut and divide glass as effectually as has hitherto been done by the diamond.

That others may understand the construction and operation of this device, we will particularly describe it.

The cylindrical shaft A is formed with one conical end to fit a corresponding socket, B, and at its other end it is formed with a disk or face, C, at right angles with the axis of the shaft. The angle D between the disk C and the cylindrical surface of the shaft A forms the cutting-edge of the tool. The angle D should be about ninety degrees, in order to secure the maximum of strength and efficiency. The efficacy of the tool is increased as the diameter of the disk C is decreased; but there are limits below which it is not practicable to go without an unsafe reduction of strength, therefore the end of the shaft A is reduced, as shown, so that the diameter of the disk C shall be about one-twentieth of one inch, which may be considered about the proper dimension.

The effective operation of the apparatus depends upon the degree of freedom with which the cutter C may revolve as it is moved across the face of the glass. The shaft A is therefore made to rest upon two large friction-wheels, E E, near to the cutting-end, and thereby the frictional resistance to the revolution of the cutting-disk C is almost, if not entirely, neutralized.

The friction-wheels E E have their bearings in a suitable frame, F, which also supports an arm, G, which projects from one of its sides, and bears at its outer end the socket B, in which is placed the conical end of the shaft A, which requires to be made of length sufficient to give the necessary steadiness of operation.

For convenience of adjustment the socket B is placed in the end of the adjusting-screw H, and should be made of hardened steel, to resist the wear incident to the rapid revolution of the cutter.

When in operation the shaft bears upon the friction-wheels E E, and is at the same time pressed toward the socket B, so that there is no tendency to displacement while in operation; but when not in use, unless retained in place by some means provided for the purpose, the cutter would be detached from the other parts of the apparatus. To guard against such possible displacement, the staple I is secured to the frame and passes over the shaft A, so as to confine it to its bearing upon the friction-wheels E E, and the collar J is placed upon the shaft A between the staple I and socket B, to prevent the shaft from moving endwise sufficiently far to disengage it from the socket B; but when it is necessary to move the shaft endwise for a permanent adjustment, the collar J may be caused to slip as far as may be necessary, and this adjustment may be secured at any time by turning the screw H.

In operation the tool should be held lightly between the fingers and thumb, with the shaft A perpendicular to the line of progression, and at an angle of about forty-five degrees to the surface of the glass. The guides K K may rest against the straight-edge or pattern. Press gently upon the tool and draw it forward with a firm and regular motion, and a continuous fracture will be produced, through which the glass may be divided as though it had been cut with a diamond.

A sharp or perfect angle at D is necessary to efficient performance, and after a considerable time of use it will be found that the forcible contact of the cutter with the glass will have caused the angle D to be slightly rounded. It will then be necessary to correct the edge by using a hone or whetstone upon the end face or disk, C, of the shaft A.

Having thus described this invention, what is claimed as new is—

A tool for cutting glass or other vitreous substances constructed to operate substantially as described.

WENDELL T. DAVIS.
AUSTIN DEWOLF.

Witnesses:
GEORGE W. BARTLETT,
CHAS. F. GOODNOW.